United States Patent [19]

Baumann

[11] Patent Number: 4,489,917
[45] Date of Patent: Dec. 25, 1984

[54] LOW TORQUE VALVE DISC FOR LINED BUTTERFLY VALVES

[76] Inventor: Hans D. Baumann, 32 Pine St., Rye, N.H. 03870

[21] Appl. No.: 452,305

[22] Filed: Feb. 10, 1983

[51] Int. Cl.$^3$ ............................................. F16K 1/22
[52] U.S. Cl. ..................................... 251/305; 251/306
[58] Field of Search ................................ 251/305, 306

[56] References Cited

U.S. PATENT DOCUMENTS

| | | | |
|---|---|---|---|
| 1,251,453 | 12/1917 | Spencer | 251/306 |
| 1,332,000 | 2/1920 | Pfau | 251/305 |
| 2,271,390 | 1/1942 | Dodson | 251/305 |
| 2,278,421 | 4/1942 | Brown | 251/305 |

FOREIGN PATENT DOCUMENTS

| | | | |
|---|---|---|---|
| 2047713 | 3/1972 | Fed. Rep. of Germany | 251/305 |
| 2449678 | 4/1975 | Fed. Rep. of Germany | 251/305 |
| 2430821 | 1/1976 | Fed. Rep. of Germany | 251/305 |

*Primary Examiner*—Martin P. Schwadron
*Assistant Examiner*—James R. Shay

[57] ABSTRACT

A butterfly valve disc with generally oval plane surface tiltingly arranged so that the outer periphery forms a perfect circle intersecting with the inner lined bore of a butterfly valve, and where the two semicircular wall portions forming said disc have annularly offset planary axes to substantially reduced hydrodynamic torque, the outer periphery further forming a rim of generally rectangular cross-section, one corner of which seatingly contacts the inner liner of said butterfly valve.

5 Claims, 5 Drawing Figures

LOW TORQUE VALVE DISC FOR LINED BUTTERFLY VALVES

BRIEF SUMMARY AND BACKGROUND OF THE INVENTION

This application discloses further improvements in and containing additional subject matter over my co-pending patent application Ser. No. 06/313,830 filed on Oct. 22, 1981.

Butterfly valves used for automatic control reduce pressure, particularly at low flow, i.e., low disc openings. Such pressure reduction can only be accomplished by acceleration and subsequent deceleration of the passing medium, where the maximum velocity is a square root function of the pressure drop. Unfortunately, such high velocities along the leading edges of butterfly valves produce undesirable side effects. Such side effects are cavitation with liquid media, aerodynamic throttling noise with gases, and a high dynamic torque with either medium. Such dynamic torque, increasing rapidly towards the fully open position and reaching a peak near 70° disc opening (see Curve A in FIG. 5), greatly interferes with the stable valve operation particularly when pneumatic actuators are employed. This torque is a function of the suction effect (much like the "lift" of an airplane wing) produced by high velocity on the upper surface of that portion of the disc pointing in the downstream direction.

Past butterfly discs of improved designs have tried to overcome this dynamic torque problem, notably among them a disc whose terminating downstream periphery has the shape of a fishtail. Another design employs semi-circular cavities on opposing sides of a circular disc. While those designs show improvements in reduction of dynamic torque, neither of them meets the additional objectives of my invention, which are:

a. reduce hydrodynamic torque;
b. provide tight shut-off;
c. create a better control characteristic.

My invention produces substantially less dynamic torque than either of the present state of the art butterfly discs by providing two tiltingly offset semi-circular wall portions forming the basic disc.

With the vane sitting at a typical seat angle of between 15°-20° from an axis perpendicular to the cylindrical butterfly valve bore, I have the upper semi-circular disc portion approximately perpendicular to said bore and the lower semi-circular wall portion tilted at an approximate angle of 30° in respect to the upper half.

As can be seen from FIG. 5 of my attached drawing, dynamic torque peaks at around 70° of the angular displacement from the vertical axis for a flat vane. Above this angle, the torque is drastically reduced and reaches a negative value beyond 90°. Two angularly offset vane halves accomplish that the upper, perpendicular half may experience a positive torque factor, being retarded in angular displacement from the lower half, while the latter at the same time crosses into a negative torque factor. The net result of the two divergent torque effects is a much lower net torque characteristic as shown in FIG. 5 Curve C of my attached drawings.

My invention also provides means to combine tight shut-off with the other aforementioned advantages, in that its configuration (contrary to other "low torque" designs) allows an angular attachment, usually between 15° and 20° to the vertical valve axis of the outer disc periphery to provide intimate contact and thereby greatly reduced valve leakage. The angle of contact is chosen depending on the type of material employed, that is, the tangent of the angle has to exceed the coefficient of static friction to avoid self-locking.

A further object of my invention is the ability to create a tight shut-off valve for so-called rubber lined butterfly valves. These valves consist usually of tubular steel or cast iron housings having either vulcanized or molded elastomeric inserts at their inner bores. It is customary to use cylindrical butterfly valve vanes for on-off purposes. Sealing is accomplished by squeezing an oversized vane into the rubber lined butterfly valve bore. This interference with, and displacement of, portions of the elastomeric insert provides the desired shut-off. However, one less desired by-product of this procedure is high static torque, also called "breakaway" torque. The other is wear of the liner material. While this breakaway torque is not considered too detrimental for hand operated valves, it nevertheless becomes highly objectionable for pneumatic operated modulating control valves. Any sudden force changes, such as previously described, tend to cause dynamic instability and are very detrimental to the desired control function of such a valve.

My invention overcomes these difficulties by providing a line contact between the tiltingly arranged vane and the aforementioned rubber liner constituting a further improvement over my co-pending patent application Ser. No. 06/313,830. Instead of having a wide annular seating contact surface that is parallel with the cylindrical bore of the butterfly valve (when in the closed position), my improved invention provides for an outer rim that has slightly rounded rectangular corners. One of the two rounded corners on either side of the vane is then capable of slight indenting compression of the rubber liner and thereby forming a so-called "line contact" over most of the peripheral vane surface. This type of seating action approaches that of a conventional valve plug in a globe style valve, this is, very little frictional energy is lost in providing tight shut-off between my vane and the rubber lined valve body. As a result, the previously described high breakaway torque is avoided and the operator torque required to provide tight shut-off is less than 30% compared to a state of the art rubber lined butterfly valve.

Yet a further improvement is provided by having an eccentric configuration of the rim by-passing and circling the central shaft of the tiltingly arranged vane. Contrary to conventional hub surfaces that seatingly engage rubber liners around a shaft, my contact surface is only semi-circular and eccentrically arranged in regards to the shaft center, to provide for gradual disengagement of this part of the rim from the rubber upon opening of the valve. This geometric improvement further reduces operating torque particularly in the open (modulating control) mode.

Yet another objective of my invention is that the angular offset vane allows the hub portion to be subdivided into two relatively short sections which eliminates the very expensive task of drilling a shaft bore through the complete diameter of the vane where the typical length of such bores is 12 times its diameter and requires the utilization of very special tools such as gun drills. My invention allows the use of conventional tooling since the bore distance can be kept to approximately two diameters.

These and other advantages and objectives will be more apparent when viewed in light of the following detained description and drawings.

DETAILED DESCRIPTION OF THE INVENTION

Figure 1:
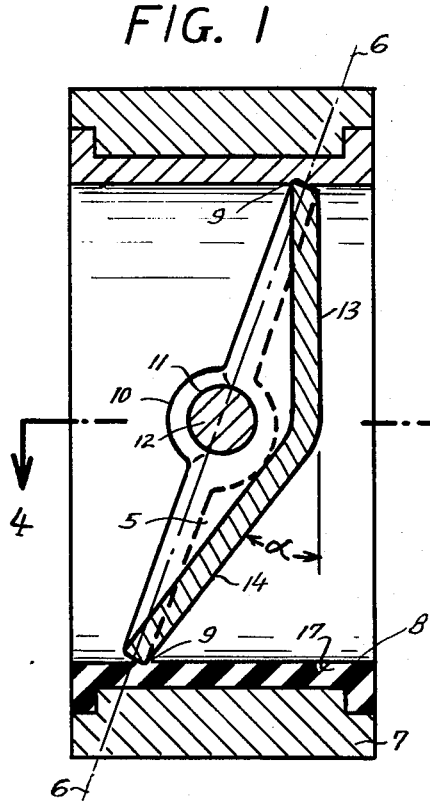
FIG. 1 is a vertical sectional view of a preferred embodiment of my invention when installed in a lined butterfly valve housing and when turned into the closed position.

Referring to FIG. 1, my invented butterfly valve disc consists in its preferred embodiment of a disc 5, the planary axis 6 of which is tilted in comparison to the vertical axis of a conventional state of the art rubber lined butterfly valve housing 7 (not part of my invention), having a circular bore 8 thus giving the disc a generally oval shaped surface area. A slightly rounded corner 9 of a flat rim 15 forming the terminating outer periphery of disc 5 is in sealing contact with the inner wall of bore 8, whenever the valve is in the "closed" position, as indicated in FIG. 1, thus providing a sealing interface for the fluid to be controlled. Hub portions 10 extend along the center of disc 5 and close to bore 8, each containing within a central circular hole 11 occupied by a valve shaft 12, which supports the tiltingly arranged disc 5. The latter is composed of two partially flat wall portions, the upper one being labeled 13 and the lower one being labeled 14. The upper semi-circular portion 13 is arranged to have a planary axis that is essentially vertical when the vane is closed. The lower semi-circular wall portion 14 is tilted at an angle α of typically 30°–35° in respect to wall portion 13. Both wall portions 13 and 14 are interjoined at the outer periphery to form a common rim 15 which has a flat and essentially rectangular terminating surface, one of whose corners 9 sealingly compress as elastomeric liner 17 which may be part of butterfly valve body 7.

Figure 4:
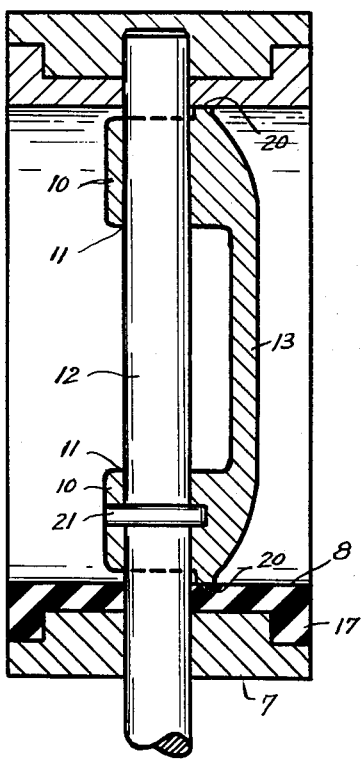
FIG. 4 is a horizontal sectional view taken along the lines 4—4, as indicated in FIG. 1.

As shown in FIG. 1, both wall portions 13 and 14 have a nearly constant wall thickness throughout and each section resembles a semi-circular flat plate having rounded edges at portions of their outer periphery to join in a rim 15 as more clearly shown in FIG. 4. FIG. 1 also shows that the intersection or joint of both wall portions 13 and 14, near the horizontal axis of bore 8, is located exterior of planary disc axis 6 and bore 11, thus generating an overall cup-shaped configuration of disc 5.

Figure 2:
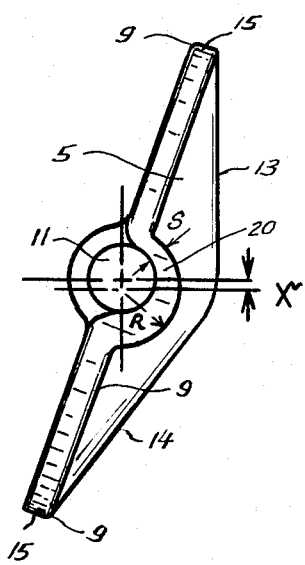
FIG. 2 is a vertical external view of my invention shown in FIG. 1.

FIG. 2 shows an exterior view of vane 5 with the butterfly valve body 7 removed for clarity. As can be seen, rim 15 extends around disc 5 up to bore 11, which is then by-passed and sealed against by a semi-circular extension 20 of rim 15. The radius describing the outer periphery of this rim extension 20 has a locus of origin at a location which is offset from the center of bore 11 by a distance "X", resulting in a gradually enlarging width "S" of said extension towards the lower section 14 of vane 5. The inner periphery of this extension is then formed by the wall of bore 11. The benefit of such an arrangement is that surface 20 forms a wedge that tends to disengage itself, i.e., has less area in tight sealing contact with bore 8 when the vane 5 is tilted towards the open position. The reason is, that upon opening, all portions of extension 20 will move around the center of bore 11, which coincides with the center of bore 8, in a clock-wise direction generally towards the center of bore 8, i.e., the point of max. radial distance. Conversely, upon closing, more and more of width "S" or rim extension 20 is compressing liner 17 by departing from a position of greater radial width of bore 8 (position towards axis 4—4 in FIG. 1) to a location of less width (positions of above axis 4—4) within bore 8. The benefit of such an arrangement is less dimensional interference and therefore less frictional torque of the vane when open, causing less wear of the rubber, or elastomeric liner, by providing means of gradual engagement or disengagement between rim extension 20 and liner 17.

Figure 3:
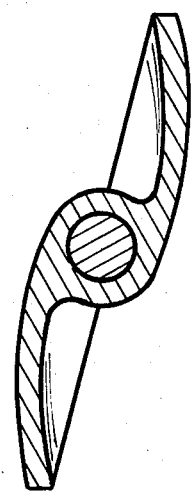
FIG. 3 is a vertical sectional view of a present state of the art low torque vane.

FIG. 3 shows a typical state of the art low torque butterfly valve vane, where two semi-circular vane halves offer torque reducing concave profiles generally along the shape of the letter "S".

FIG. 4 shows a horizontal sectional view of my invention along line 4—4 in FIG. 1. Note the sealing interference of rim extension 20 with liner 17. Shaft 12 is shown pinned at 21 to vane hub 10.

Figure 5:
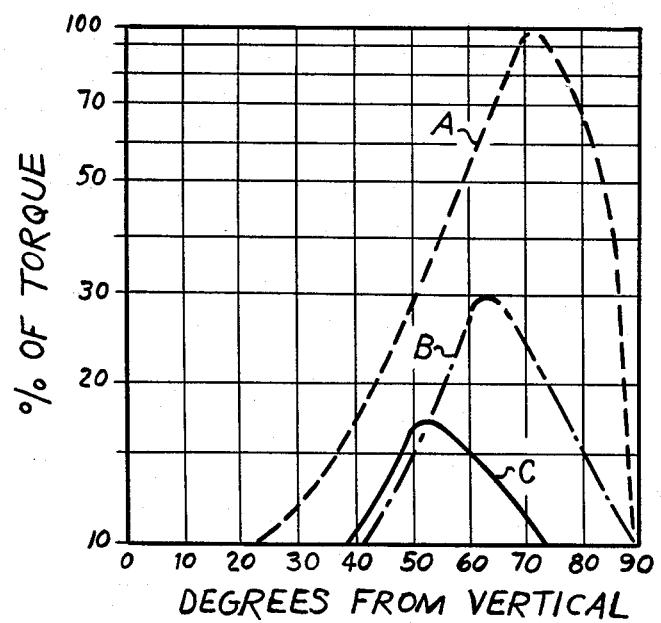
FIG. 5 is a graphic comparison of the dynamic torque characteristic of my invention compared to that of conventional state of the art butterfly valve discs.

FIG. 5 shows test results of dynamic torque measured as a function of angular displacement of typical vane configurations from an axis located perpendicular to the butterfly valve bore. The curve labeled "A" depicts the conventional, generally flat and symmetrical butterfly valve disc whose torque values peak around 70°. An S-shaped vane configuration as shown in FIG. 3 was able to reduce the dynamic torque to about 30% of that of a conventional vane. However, by providing the angular offset of my invention, further substantial improvement was measured to reduce the peak value to about 17% as shown with Curve "C".

Having shown my invention in a preferred configuration, should not exclude the possibility to make numerous modifications, such as to attach lifing arms for the connection of valve stems to disc 5 and inserting bearings inside a bore 11, without departing from the spirit of my invention or from the scope of the attached claims.

Another preferred modification of my invention, that should not detract from the scope of the following claims, is the attachment of ribs or teeth around the periphery of the semi-circular wall portions 13 and 14 for the purpose of noise reduction as taught in my U.S. Pat. No. 3,960,177.

I claim:

1. A low torque butterfly disc comprising:
    a. an oval shaped disc, the outer periphery forming a rim whose planary axis is angularly offset from the perpendicular axis of the cylindrical bore of a butterfly valve and which is fitting closely within said cylindrical bore, forming straight lines of contact with said bore when in the closed valve position, said disc being further composed of one upper and one lower centrally connected nearly semi-circular wall section each having nearly constant wall thickness throughout and whose planary axis are angularly offset with respect to each other and both further have curved outer peripheries which interjoin to form said rim, the central connection between the two wall sections is located exterior of the planary axis of said rim, thereby generating a generally cup-shaped configuration of said disc;

b. at least one perpendicular hub section located on a common axis central to said cylindrical bore and containing within it a bore to receive a supporting valve shaft;

c. said rim having an essentially flat termination surface perpendicularly disposed to said planary axis of the oval shaped disc and further having rounded edges, one of them capable of sealingly interacting with the bore of the butterfly valve;

d. said rim further extends around the bore contained within the perpendicular hub section, said rim extension being capable of sealing interference with said butterfly valve bore, and having an outer periphery that follows a radius whose locus is displaced from the center of said hub bore.

2. A low torque butterfly valve disc as described in claim 1, wherein the planary axis of the upper semi-circular wall portion is generally aligned with the perpendicular axis of the cylindrical bore of said butterfly valve when in the closed position.

3. A low torque butterfly valve disc as described in claim 1, wherein each of said semi-circular wall sections is displaced from the central section of said oval shaped disc to avoid interference with said supporting valve shaft.

4. A low torque butterfly valve disc as described in claim 1, wherein the angular offset of the planary axis of the rim of said oval shaped disc from the perpendicular axis of the cylindrical butterfly valve bore is between 13° and 20° when in the closed position.

5. A low torque butterfly valve disc as described in claim 1, wherein the planary axis of the lower semi-circular wall portion is generally tilted at an angle of 28° to 38° from the perpendicular axis of the straight cylindrical bore of said butterfly valve when in the closed position.

* * * * *